United States Patent [19]

Lambuth

[11] 4,279,788

[45] Jul. 21, 1981

[54] AQUEOUS POLYISOCYANATE-LIGNIN ADHESIVE

[75] Inventor: Alan L. Lambuth, Boise, Id.

[73] Assignee: Boise Cascade Corporation, Boise, Id.

[21] Appl. No.: 141,381

[22] Filed: Apr. 18, 1980

[51] Int. Cl.³ .......................... C08H 5/02; C08L 97/02
[52] U.S. Cl. ...................................... 260/9; 260/17.5; 156/331.4
[58] Field of Search .................................. 260/17.5, 9

[56] References Cited

U.S. PATENT DOCUMENTS

| | | | |
|---|---|---|---|
| 2,854,422 | 9/1958 | Nichols | 260/17.5 |
| 2,906,718 | 9/1959 | Mills et al. | 260/17.5 |
| 3,519,581 | 7/1970 | Moorer et al. | 260/17.5 |
| 3,577,358 | 5/1971 | Santelli et al. | 260/2.5 |

*Primary Examiner*—Earl A. Nielsen
*Attorney, Agent, or Firm*—Eugene D. Farley

[57] ABSTRACT

An aqueous polyisocyanate-lignin adhesive for use particularly in the manufacture of wood composition board comprises in admixture with each other an organic polyisocyanate and the lignin product resulting from the chemical pulping of lignocellulose.

29 Claims, No Drawings

AQUEOUS POLYISOCYANATE-LIGNIN ADHESIVE

BACKGROUND AND BRIEF SUMMARY OF THE INVENTION

This invention relates to aqueous organic polyisocyanate adhesives containing a major portion of the lignin (waste liquor solids) resulting from the chemical pulping of lignocellulose. This lignin product comprises principally recovered lignin which has been modified by the chemical pulping procedure to which it has been subjected and accordingly is to be distinguished from native lignin, i.e. the "proto-lignin" found in the lignocellulosic structure of growing plants.

Organic polyisocyanate resins containing lignin are not new to the art.

Nichols U.S. Pat. No. 2,854,422 discloses a composition comprising diisocyanate-linked elastomers and lignin wherein the lignin is added to a formed polyurethane and is merely present as a filler.

Mills et al U.S. Pat. No. 2,906,718 discloses lignin-reinforceable, vulcanizeable rubber stocks wherein the lignin takes the place of the usual carbon black reinforcing material.

Moorer et al U.S. Pat. No. 3,519,581 disclose a method of producing synthetic lignin-polyisocyanate resins, which may be used as adhesives, by dissolving lignin in a glycol solvent and reacting it with an organic polyisocyanate.

Santelli et al U.S. Pat. No. 3,577,358 disclose organic isocyanate-lignin reaction products, which also may be used as adhesives, formed by reacting an organic polyisocyanate with lignin dissolved in a non-aqueous solvent therefor, the solvent again being a glycol, or dioxane.

However, the polyisocyanate-lignin adhesives of the prior art are neither designed nor suitable for large scale use as bonding agents for wood products, in particular for bonding wood particles or fibers together in the manufacture of wood composition board. The reason for this is to be found in the fact that the patentees sought assiduously to avoid the inclusion of water in the formulation of the adhesives of their inventions in order to avoid excessive urethane formation and foaming during their preparation and use. Moorer et al state in U.S. Pat. No. 3,519,581 for example, at column 6, lines 21–28:

"Water is a solvent for the alkali metal and the ammonium salts of lignin. However, water is so extremely reactive with polyisocyanates that water is not availed of as a solvent for the lignin, but when used is only used in small amount for reaction with part of the polyisocyanate for the production of carbon dioxide as a by-product, the generation of the carbon dioxide resulting in the production of a foam."

The prior art accordingly teaches the use of water with polyisocyanate-lignin mixtures only as a terminal foaming or blowing agent when a foamed urethane product is desired. The prior art adhesives incorporate not an aqueous solvent for the lignin, but rather a proportion of a glycol, ether, or other non-aqueous solvent. They accordingly are totally unsuited for use as wood bonding adhesives.

Wood adhesives must be tolerant of water first, because of the inherent water content of pulping waste liquors, which are the primary sources of the lignin solids used in the adhesives, and second because the wood pieces to be bonded usually have an appreciable water content. For this reason it is impractical, indeed impossible, to employ water-sensitive polyisocyanates as components of adhesive mixtures containing also aqueous solutions of lignin, the adhesive mixtures to be used in the gluing together of pieces of wet wood.

Furthermore, in the art of gluing wood, the adhesives to be used in gluing wood must be of relatively low viscosity so that they may be applied to the wood pieces by such standard techniques as spray-, roll-, or curtain-coating. When thus applied, they must cover the pieces uniformly and bond them together efficiently.

This desired result cannot be achieved by the polyisocyanate-lignin adhesive of the prior art. The prior art adhesives are gummy products of extremely high viscosity. For example, the polyisocyanate-lignin adhesive disclosed in Santelli et al U.S. Pat. No. 3,577,358, at Col. 8, lines 16–30 is described as a paste having a softening point of over 270° C. This paste is disclosed as an adhesive for glass. It is totally unsuited as an adhesive for wood. Its high viscosity prevents its effective application.

I now have discovered, and it is the essence of the present invention, that under certain circumstances water in fact may be used in major amount in the manufacture of organic polyisocyanate-lignin adhesives to be used in the manufacture of bonded wood products, in particular in the manufacture of wood composition board products such as wood particle board and wood fiber board. This discovery is based on three principal observations.

First, water is an excellent solvent for lignin and may be used in that capacity in the formulation of the herein described adhesive.

Second, the polyisocyanates in the molecular weight range of 200–10,000 are oily, strongly hydrophobic liquids which at ambient temperature react only very slowly with water to form urethanes and carbon dioxide gas. This reaction occurs only at the limited interface between the oily polyisocyanate phase and the water phase. Even when the polyisocyanate is emulsified with water, the reaction takes place so slowly at ordinary mill temperatures that gas formation is not a problem. The aqueous solution of lignin provided by ordinary waste liquor resulting from the chemical pulping of lignocellulose thus may be used as the water solution of lignin without any modification whatsoever.

Third, the gaseous evolution which in minor degree does take place in the gluing of wood pieces with the herein described adhesive is entirely accommodated by the porous matrix to which the glue is applied. In particular, a matrix comprising a wood composition board furnish is sufficiently porous to absorb totally any carbon dioxide gas evolved by the reaction between the polyisocyanates and water without adversely affecting product properties.

In its broad aspect the adhesive of the invention accordingly comprises an organic polyisocyanate having a molecular weight in the range of from 200 to 10,000 and an aqueous solution of waste liquor solids, preferably the waste liquor derived from chemical pulping of lignocellulose, the water being used in amount sufficient to dissolve the lignin and to establish a working adhesive viscosity.

The invention further comprises as a new article of manufacture the glued product comprising pieces of wood bonded together with the aforesaid adhesive. In particular, it comprises wood composition board comprising a hot-consolidated mat comprising small pieces of wood glued together with the said adhesive.

DESCRIPTION OF PREFERRED EMBODIMENTS OF THE INVENTION

As indicated above, the essential components of the herein described adhesive are a polyisocyanate, lignin, and water. These are used in the following general and preferred proportions expressed in parts by weight

|  | General | Preferred |
|---|---|---|
| Organic polyisocyanate (molecular weight 200 to 10,000) | 20–95 | 50–80 |
| Lignin solids in aqueous solution | 5–80 | 20–50 |
| Water | 5–1000 | 20–500 |

Considering first the organic polyisocyanate component of the adhesive:

The organic polyisocyanates are generally applicable in the adhesives of the invention. These include the aliphatic, alicyclic, and aromatic polyisocyanates characterized by containing two or more isocyanato groups. Illustrative of such compounds are the following:
m and p phenylene diisocyanates
Toluene-2,4- and 2,6-diisocyanates*
Diphenylmethane-4,4-diisocyanate*
4 Chloro-1,3-phenylene diisocyanate
Napthalene-1,5-diisocyanate
Diphenylene-4,4-diisocyanate
3,3'-Dimethyl diphenylmethane-4,4'-diisocyanate
3-Methyldiphenylmethane-4,4'-diisocyanate
Diphenylether diisocyanate
Cyclohexane-2,4- and 2,3-diisocyanates
1-Methyl cyclohexyl-2,4- and 2,6-diisocyanates
Bis(isocyanatocyclohexyl-) methane
2,4,6-Triisocyanatotoluene
2,4,4-Triisocyanatodiphenyl ether
Polymethylene polyphenyl Polyisocyanates*
Methylene diphenyl diisocyanate
Triphenylmethane triisocyanate*
3,3'-Ditolylene-4,4-diisocyanate
4,4' Methylenebis (2-methyl-phenyl isocyanate)
Hexamethylene diisocyanate
Cyclohexylene-1,3 and 1,2-diisocyanate Of the foregoing, the preferred ones for reasons of present or potential commercial availability, and effective action, are marked by an asterisk (*). Of particular interest are the polyisocyanates sold under the brand names of "PBA 1042" (The Rubicon Chemicals Inc.) and "Papi" (The Upjohn Co.). These comprise principally polymethylene polyphenyl polyisocyanates with a number average molecular weight of 340 to 400.

It is critical to the successful use of the herein described polyisocyanate adhesive components that they have a molecular weight of from 200 to 10,000, preferably from 300 to 2000. Polyisocyanates of too low molecular weight form mixtures of too low viscosity and too high substrate penetration characterstics to be useful as adhesives. Also, they are considerably more volatile, quite toxic and accordingly more dangerous to use in the hot press.

Polyisocyanates of too high molecular weight tend to produce adhesive mixtures which are too viscous to be handled and used readily as wood adhesives. This is true even though the viscosity of the adhesive mixture may be lowered by adding water or aqueous lignin solutions directly to the hydrophobic polyisocyanates and emulsifying them to yield a product of low viscosity. When polyisocyanates of too high molecular weight are thus treated, the resulting emulsions, although of low viscosity, are too unstable to be useful, having a service life of but a few minutes.

Polyisocyanates of suitably high molecular weight may be prepared by using large molecule isocyanate monomers. Alternatively, they may be prepared in known manner by taking advantage of the reactive isocyanate groups of the monomer and building up multiple molecular units of higher molecular weight. "Chain builders" useful for this purpose are those containing active hydrogen atoms, in particular the polyesters and polyols, such as the glycols and glycol ethers used in predetermined amount sufficient to produce reactive polyisocyanate prepolymers of the desired molecular weight and significant excess isocyanate functionality.

Illustrative glycols and glycol ethers are the following:
Polyethylene glycols to 6000 mol. wt. (200 to 2000 preferred)*
Polypropylene glycols to 6000 mol. wt. (200 to 2000 preferred)*
Ethylene glycol monobutyl ether ("Butyl cellosolve")
Diethylene glycol monobutyl ether ("Butyl carbitol":)*
Ethylene glycol monoethyl ether ("Cellosolve")*
Diethylene glycol monoethyl ether ("Carbitol")
Cellosolve acetate
Dimethoxy tetraglycol
Dipropylene glycol methyl ether
Ethylene glycol monomethyl ether ("methyl cellosolve")
Sorbitol*
Phenyl cellosolve
Propylene glycol methyl ether
Triethylene glycol
Tripropylene glycol methyl ether
Glycols or polyglycols partially esterified with polycarboxylic organic acids such as adipic, sebacic, succinic, oxalic, etc.
2,4,6-Hexane triol*
Glycerol*
Propylene glycol partially esterified with adipic acid*
Trimethylol propane*
Acrylic and methacrylic acid esters Preferred members of the above group are indicated by an asterisk(*).

The polyisocyanate materials, with or without the incorporation of the chain building adducts are manufactured by conventional methods. They usually contain a preponderance of dimers and trimers with smaller proportions of higher polymers. They serve the adhesive function of reacting in the hot press with the various functional groups on the lignin molecules, on the urethane matrix, and on both the cellulosic and native lignin of wood itself, to form a highly efficient agent for bonding together pieces of wood or other substrate.

Considering next the lignin component for the herein described adhesives:

Lignin derived from a wide variety of sources may be employed in the formulation of the adhesives. The preferred source is one or a mixture of the various waste liquors resulting from the chemical pulping of lignocellulose. Exemplary are:
Kraft waste liquor Soda waste liquor
Calcium base sulfite waste liquor
Magnesium base sulfite waste liquor
Ammonium base sulfite waste liquor
Sodium base sulfite waste liquor
Magnafite waste liquor
Sodafite waste liquor
Chlorinated waste liquors
Brominated waste liquors Lignins from hardwood and soft wood sources may also be used, as may lignins from acid-precipitated and alkali-reconstituted kraft liquors. Desugared lignins also may be used.

The chlorinated waste liquors derived from paper mill bleach plants are of particular interest because they are abundant and of little present commercial value. Both the chlorinated and brominated waste liquors (1-30% by weight halide ion, lignin solids basis) are of further interest because of their fire resistant properties. Also, chlorination and bromination make the lignins more reactive chemically toward isocyanates and other synthetic resin polymers.

Whatever their source, the waste liquors may be used at their original process pH, viz. the entire range of pH 1 to pH 13. They also may be used in a wide range of aqueous dilutions, ranging from their original process solids content of 10 or 12% by weight up to a concentrated solids content of from 20 to 55% by weight.

The lignin residues are effectively incorporated into the matrix of isocyanate polymer as it cures, becoming an integral part of the adhesive structure. In fact, the lignin residues can actually be used to form higher molecular weight lignin-isocyanate polymers replacing, and behaving like, the polyols normally employed for that purpose.

Turning now to the water component of the herein described adhesives:

As noted above, a substantial amount of water is used in the formulation of the adhesives in spite of the fact that the polyisocyanates conventionally are considered to be notoriously water reactive. The water serves several valuable and essential functions.

It serves as a solvent for the lignin solids, replacing expensive and sometimes toxic organic solvents, which must be almost totally removed by evaporation prior to hot pressing, thereby adding a further element of waste and cost.

It serves as a valuable viscosity control agent in the formulation of adhesives which may be applied effectively to wood pieces by current spray coating and other techniques. In the presence of water, the polyisocyanates, even those of substantial molecular weight, may be emulsified to form emulsions of relatively low, and sprayable viscosity.

The water also serves a valuable heat transport function. During hot pressing it is converted to steam at the board surfaces and in this form carries platen heat to the center of the particle board or other product being glued, thus materially shortening the hot pressing cycle. At the same time it serves an important plasticizing function as required to accommodate irregularities in chip geometry during the manufacture of wood particle board, thus gaining intimate contact between individual chip surfaces through plastic flow under pressure, thereby eliminating excessive void volume and poorly bonded areas in the center of the board. Still further, it provides the pre-pressing tack needed for cold press mat consolidation, while depositing the lignin solids on the surface of the chips where they react with the cyanato groups of the polyisocyanate component of the adhesives. The water solvent, having performed these essential functions, then leaves the board as steam.

Other materials may be incorporated in the adhesives as desirable or necessary to achieve desired properties in the finished adhesives.

Thus formaldehyde may be added in the polyisocyanate-formaldehyde ratio of from 3:1 to 6:1. The formaldehyde reacts with some of the lignin solids and also with any polyurea which may be present to form additional polymeric binder. Other additives which may be incorporated in the adhesives include fillers, wax emulsions, emulsion stabilizers, coloring materials, and preservatives used in conventional amount and manner.

In formulating the adhesives of the invention with the above primary components, these components in predetermined proportions are simply mixed in suitable and conventional mixing equipment until a uniform mixture is obtained. Preferably they are mixed in an intensive-shear mixer until the mix is smooth.

The order of mixing is not of critical importance. However, in a typical sequence the polyisocyanate is placed in the mixer first. Any additives then are added and the constituents mixed until smooth. Next, the water solution of lignin is mixed in and, if necessary, additional water added in amount sufficient to achieve the desired viscosity.

In order to minimize reaction between the isocyanate and water to form the corresponding urethane and liberate carbon dioxide, mixing is carried out at or near room temperature (10°-30° C.). As indicated above, under the conditions of the invention this reaction occurs very slowly and when the adhesive is applied to the gluing of wood does not interfere because of the porous character of the wood.

The finished adhesive is stable for a reasonable length of time and may be stored and used in the plant in conventional manner. The unmixed components may be stored for extended periods of time. When the adhesive is used in the manufacture of wood composition board such as wood fiberboard or wood particle board, wood fibers or particles of predetermined moisture content are coated with the adhesive by atomizing or tumbling in the conventional manner. The adhesive sprayed may be the finished adhesive, or may comprise the adhesive components sprayed on the particles either simultaneously or sequentially.

Where the polyisocyanate component of the adhesive is capable of forming a stable emulsion in water, the adhesive may be emulsified and applied as an emulsion of low viscosity, e.g. a viscosity equivalent to 10 to 50 centipoises at 25° C.

In instances where the adhesive is not emulsified prior to application, the individual components may be applied separately at viscosity levels equivalent to 50 to 500 centipoises at 25° C.

An application of from 1 to 10% of adhesive, solids basis, conventionally is employed. The adhesive coated wood particles then are felted or formed into a mat of the desired proportions which next is consolidated to the desired thickness and density in a hot press. Typical press conditions are from 200 to 600 psi, at from 150 to 220 degrees C. for from 1.5 to 10 minutes.

The aqueous polyisocyanate-lignin adhesives of the invention and the manner of their application to the manufacture of wood composition board are illustrated in the following examples, wherein proportions are given in parts by weight.

In examples 1–26 particle board was made from particles of mixed pine wood having a moisture content of about 4.5%. The adhesive was sprayed onto the particles for a spray time of from 1 to 15 minutes. The forming time was 5 minutes. No wax was used.

The resulting mat was cold prepressed for 5 seconds at 300 psi followed by 1 second hold. It then was hot pressed for 4½ minutes, where isocyanate-lignin adhesives and urea formaldehyde adhesives were used, or for 5½ minutes where phenol-formaldehyde resins were used for purposes of comparison.

The time to stops in the press was 10–15 seconds. The pressing temperature was 325° F. and the platen pressure was 350 psi to stops, followed by 220 psi holding pressure to discharge. There was no pressure bleed to press opening and no significant post cure. The board thickness was ½ inch.

The results are set forth in the following tables wherein the test results are expressed as ASTM D 1037 values and wherein:

m c = moisture content
IB = internal bond
TS = cold water thickness swell, 24 hour immersion
LE = linear expansion, wet, after 3 hour boil
MOE = modulus of elasticity
Resin A = polymethylene polyphenyl isocyanate ("ARCO PMDI 79-4")
Resin P = do. ("PAPI 580")
Resin R = do. ("RUBICON PBA 1042")
Resin R' = methylene diphenyl isocyanate reacted with polypropylene glycol (m.w. 2000)
R'' = do. (m.w. 1000)
R''' = methylene diphenyl isocyanate reacted with methacrylic acid glycol ester
Resin T = toluene diisocyanates reacted with glycerine
Resin HX = hexamethylene diisocyanate reacted with glycerine ("Mondur HX")
Resin W = methylene bis(4-cyclohexyl isocyanate) ("Desmodur W")
Resin UF = commercial urea formaldehyde particle board resin
Resin PF = commercial phenol formaldehyde particle board resin
Cl kraft lignin = chlorinated kraft lignin solids containing 3% by weight chlorine, expressed as chloride ion.

| PURPOSE | EX. NO. | RESIN TYPE | RESIN AMT. | TOTAL ADH. | LIGNIN TYPE | LIGNIN AMT. | LIGNIN % | WATER AMT. | ADDITIVE AMT. | MIX pH | APPLICATION 1st | APPLICATION 2nd | MAT M.C. | DRY MORE | DRY IB | WET TS | BOIL LE |
|---|---|---|---|---|---|---|---|---|---|---|---|---|---|---|---|---|---|
| CONTROLS | 1 | UF | 6.0% | 6.0% | — | — | — | 3.2% | 0.5% NH₄Cl | 5.6 | ROW | — | 7.7% | 260M | 151 | 20.1% | FAIL |
| | 2 | PF | 5.5 | 5.5 | — | — | — | 7.6 | — | 10.2 | RW | — | 12.6 | 240 | 161 | 28.3 | 2.0% |
| LOW-HIGH pH RANGE | 3 | R | 2.35% | 3.5% | Ca# | 1.15% | 33% | 3.5% | H₂SO₄-pH 1 | 1.0 | RLOW | — | 8.0% | 269M | 168 | 32.1% | 2.9% |
| | 4 | R | 2.35 | 3.5 | NH₃# | 1.15 | 33 | 3.4 | — | 3.3 | RLW | — | 7.9 | 259 | 113 | 35.8 | 1.9 |
| | 5 | A | 2.35 | 3.5 | NH₃ | 1.15 | 33 | 2.2 | — | 7.0 | R | LOW | 6.7 | 261 | 180 | 23.2 | 2.4 |
| | 6 | A | 2.35 | 3.5 | KRAFT | 1.15 | 33 | 3.7 | NaOH-pH 7 | 11.0 | R | LW | 8.2 | 255 | 168 | 30.9 | 2.2 |
| | 7 | A | 2.35 | 3.5 | KRAFT | 1.15 | 33 | 2.7 | — | 13.3 | R | LOW | 7.2 | 223 | 161 | 30.9 | 2.1 |
| ADHESIVE APPLI-CATION RANGE | 8 | A | 1.00% | 1.5% | NH₃ | 0.50% | 33% | 0.9% | NaOH-pH 13 | 3.4 | R | LW | 5.4% | 184M | 88 | 37.8% | 2.4% |
| | 9 | R | 1.67 | 2.5 | Na# | 0.83 | 33 | 2.5 | — | 6.1 | RLW | — | 7.0 | 280 | 150 | 28.0 | 2.7 |
| | 10 | R | 2.35 | 3.5 | Ca | 1.15 | 33 | 3.9 | — | 8.4 | R | LOW | 8.4 | 283 | 115 | 37.7 | 2.0 |
| | 11 | P | 3.02 | 4.5 | NH₃ | 1.48 | 33 | 3.2 | — | 3.4 | RLOW | — | 7.7 | 393 | 170 | 26.1 | 1.4 |
| LIGNIN SUBSTI-TUTION RANGE | 12 | R | 2.80% | 3.5% | NH₃ | 0.70% | 20% | 3.1% | 0.6% CH₂O | 3.3 | R | LOW | 7.6% | 295 | 143 | 30.0% | 1.5% |
| | 13 | A | 2.35 | 3.5 | Ca | 1.15 | 33 | 1.2 | 1.0% CH₂O | 3.8 | RLW | — | 5.7 | 387 | 159 | 23.1 | 1.2 |
| | 14 | R | 1.75 | 3.5 | Ca | 1.75 | 50 | 3.4 | — | 3.8 | R | LW | 7.9 | 242 | 115 | 38.4 | 2.0 |
| | 15 | A | 1.15 | 3.5 | NH₃ | 2.35 | 67 | 4.3 | — | 3.5 | RLW | — | 8.8 | 228 | 122 | 42.8 | 3.6 |
| | 16 | A | 0.88 | 3.5 | Ca | 2.63 | 75 | 3.2 | — | 3.9 | R | LW | 7.7 | 232 | 109 | 65.2 | 5.4 |
| LIGNIN TYPES | 17 | A | 2.35% | 3.5% | Mg# | 1.15% | 33% | 1.2% | — | 4.6 | R | LW | 6.3 | 345M | 168 | 30.2% | 2.1% |
| | 18 | A | 2.35 | 3.0 | SODA | 0.65 | 22 | 1.6 | — | 3.9 | R | LW | 6.1 | 326 | 185 | 24.9 | 1.9 |
| | 19 | A | 2.35 | 3.5 | NH₃** | 1.15 | 33 | 1.2 | — | 4.75 | R | LW | 5.7 | 350 | 177 | 29.8 | 2.0 |
| | 20 | R | 2.35 | 3.5 | Cl KRAFT | 1.15 | 33 | 7.0 | — | 4.2 | RLW | — | 11.5 | 238 | 75 | 44.4 | 2.7 |
| RESIN TYPES | 21 | R | 2.35% | 3.5% | Ca | 1.15% | 33% | 3.5% | — | 3.9 | RLW | — | 8.0% | 310 | 113 | 29.7% | 2.2% |
| | 22 | R' | 2.35 | 3.5 | Ca | 1.15 | 33 | 3.5 | — | 3.9 | RLW | — | 8.0 | 331 | 132 | 30.2 | 2.1 |
| | 23 | R'' | 2.35 | 3.5 | Ca | 1.15 | 33 | 3.5 | — | 3.8 | RLW | — | 8.0 | 332 | 155 | 28.7 | 1.9 |
| | 24 | T | 2.35 | 3.5 | Ca | 1.15 | 33 | 1.4 | — | 3.9 | R | LW | 5.9 | 225 | 87 | 53.5 | — |
| | 25* | W | 2.35 | 3.5 | Ca | 1.15 | 33 | 1.4 | — | 3.9 | R | LW | 5.9 | 306 | 100 | 36.3 | 4.5 |
| | 26* | HX | 2.35 | 3.5 | Ca | 1.15 | 33 | 1.8 | — | 9.5 | R | LW | 6.3 | 221 | 58 | — | — |

*9-minute press time.
**High-yield NH₃ liquor containing sugar.
Sulfite spent liquor base.
Application Code:
R = Resin;
L = Lignin;
W = Water;
O = Other It will be observed from the results reported in the table that the glues of my invention performed satisfactorily as particle board glues, even though they contained a large proportion of lignin, and contained no wax. In substantially all cases their performance met commercial particle board standards, and compared favorably with the performance of the control commercial urea formaldehyde and phenol formaldehyde paticle board glues.

EXAMPLE 27

This example illustrates the application of the adhesive of the invention to the production of wood fiberboard.

Mixed fir wood was reduced to the form of wood fibers (as opposed to the wood particles of the preceding examples). The fibers had a moisture content of about 10% by weight.

The fibers were sprayed over a spray period of about 2 minutes with an adhesive comprising 2.35% isocyanate prepolymer (polymethylene polyphenyl isocyanate; "Rubicon PBA 1042") and 1.15% of calcium base waste liquor having a solids content of 50% by weight. The adhesive mixture contained no wax. The adhesive application was 3.5%, dry fiber basis.

The adhesive coated fibers were felted into a mat over a forming time of about 10 minutes. The mat was cold pressed for preliminary consolidation and then hot pressed for 4½ minutes using a pressure of 350 psi to stops, followed by 220 psi for holding.

The resulting laboratory boards had properties as follows:

| MOR: | 2076 psi |
|---|---|
| MOE | 306,000 psi |
| TS: | 21.5% |
| LE: | 0.69% |

Control fiberboards made as above except containing no waste lignin had properties as follows:

| MOR: | 2453 psi |
|---|---|
| MOE: | 346,000 psi |
| TS: | 16.1% |
| LE: | 0.69% |

It may be seen that the fiberboards containing 33% waste liquor replacing polyisocyanate in the binder maintained adequate strength properties and essentially equivalent dimensional properties on exposure to water. This is important in view of the extensive use of medium density fiberboard as exterior siding.

EXAMPLE 28

This example illustrates the application of the adhesives of the invention to the gluing of solid pieces of wood. The adhesive employed was a mixture of isocyanate prepolymer and lignin, without wax.

The isocyanate prepolymer was polymethylene-polyphenyl isocyanate ("MDI"). This was employed as an emulsion having about 50% solids and containing about 5% cellulosic filler. The emulsion solids comprised the isocyanate and about 50% polyvinyl alcohol-acetate chain builder.

Mixed with the resulting polyvinyl-isocyanate composition, sold commercially by Ashland Chemical Co. under the brand name of "Megabond", was sufficient 50% solids calcium base sulfite waste liquor ("Toranil") to yield a glue containing 25% lignin solids.

The glue was applied to Douglas Fir 2×4 lumber machined on the ends with an Am. Inst. of Timber Construction (AITC)-approved 1⅛" finger joint pattern. The lumber had a moisture content of 12%.

The adhesive application was ten grams per joint. After the joints have been compressed cold at 1450 psi for at least three seconds, the net glue retained was seven grams per joint after glue squeeze out.

The lumber joints were cured for five days at 20° C., ripped lengthwise to 1½" square cross section and subjected to the AITC wet and dry bending tests to destruction. The results were as follows:

| | AITC DRY TEST | | AITC 110 WET TEST | |
|---|---|---|---|---|
| | Breaking Strength | % Wood Failure | Breaking Strength | % Wood Failure |
| "Megabond" Control | 8568 | 90 | 7532 | 70 |
| "Megabond" including 25% lignin | 8568 | 75 | 7532 | 79 |

Both the Megabond control and lignin-containing adhesives met AITC and Western Wood Products Association (WWPA) specifications for end-jointing structural lumber.

I claim:

1. An aqueous polyisocyanate-lignin adhesive comprising an aqueous solution of lignin solids derived from the chemical pulping of lignocellulose and an adhesive-forming quantity of organic polyisocyanate polymer having a molecular weight of from 200 to 10,000, the water being used in amount sufficient to establish a working adhesive viscosity.

2. A water-tolerant, sprayable, adhesive for wood products comprising, in parts by weight:

| Organic polyisocyanate having a molecular weight from 200 to 10,000 | 20-95 |
|---|---|
| Lignin solids in aqueous solution | 5-80 |
| Water | 5-1000 | the lignin solids being the product of the chemical pulping of lignocellulose, the water being expressed as the total water present, being the sum of water added and the water content of the lignin solution.

3. The adhesive of claim 2 wherein the polyisocyanate has a molecular weight of from about 300 to about 2,000 and the component use is in the following proportions, expressed in parts by weight:

| Organic polyisocyanate | 50-80 |
|---|---|
| Lignin solids in aqueous solution | 20-50 |
| Water | 20-500 |

4. The adhesive of claim 2 wherein the lignin comprises calcium base sulfite waste liquor.

5. The adhesive of claim 2 wherein the lignin comprises ammonium base sulfite waste liquor.

6. The adhesive of claim 2 wherein the lignin comprises sodium base sulfite waste liquor.

7. The adhesive of claim 2 wherein the lignin comprises kraft waste liquor.

8. The adhesive of claim 2 wherein the lignin solids in aqueous solution comprises chlorinated kraft waste liquor.

9. The adhesive of claim 2 wherein the lignin solids in aqueous solution comprises brominated sulfite waste liquor.

10. The adhesive of claim 2 wherein the organic polyisocyanate comprises polymeric polymethylene polyphenyl isocyanate.

11. The adhesive of claim 2 wherein the organic polyisocyanate comprises polymeric diphenylmethane diisocyanate.

12. The adhesive of claim 2 wherein the organic polyisocyanate comprises polymeric toluene diisocyanate and a chain builder therefor.

13. The adhesive of claim 2 wherein the organic polyisocyanate comprises polymeric triphenylmethane triisocyanate.

14. The adhesive of claim 2 including as a co-reactant formaldehyde in the ratio of from 3 to 1 to 6 to 1 parts by weight organic polyisocyanate to formaldehyde.

15. The adhesive of claim 2 wherein the organic polyisocyanate comprises the reaction product of an organic isocyanate and a polyhydroxy glycol used in predetermined amount sufficient to produce a reactive polyisocyanate having the said molecular weight.

16. The adhesive of claim 15 wherein the glycol comprises polyethylene glycol having a molecular weight of up to 6000.

17. The adhesive of claim 15 wherein the glycol comprises polypropylene glycol having a molecular weight of up to 6000.

18. The adhesive of claim 15 wherein the glycol comprises propylene glycol partially esterified with adipic acid.

19. The adhesive of claim 15 wherein the glycol comprises trimethylol propane.

20. The adhesive of claim 15 wherein the glycol comprises 2,4,6-hexane triol.

21. The adhesive of claim 15 wherein the isocyanate comprises toluene diisocyanate and the glycol comprises polypropylene glycol.

22. As a new article of manufacture, the glued product comprising pieces of wood bonded together with an adhesive comprising an aqueous solution of lignin derived from the chemical pulping of lignocellulose and an adhesive-forming quantity of organic polyisocyanate polymer having a molecular weight of from about 200 to about 10,000, the water being used in amount sufficient to establish a working adhesive viscosity.

23. As a new article of manufacture, the wood composition board comprising a hot-consolidated mat comprising small pieces of wood glued together with from 1 to 10% by weight of the mat of an adhesive comprising, in parts by weight:

| | |
|---|---|
| Organic polyisocyanate having a molecular weight from 200 to 10,000 | 20-95 |
| Lignin solids in aqueous solution | 5-80 |
| Water | 5-1000 | the lignin solids being the product of the chemical pulping of lignocellulose, the water being expressed as the total water present, being the sum of the water added and the water content of the lignin solids solution.

24. The wood composition board of claim 23 wherein the adhesive has a composition as follows:

| | |
|---|---|
| Organic polyisocyanate having a molecular weight from 200 to 10,000 | 50-80 |
| Lignin solids in aqueous solution | 20-50 |
| Water | 20-500 |

25. The composition board of claim 24 wherein the lignin solids in aqueous solution comprises calcium base sulfite waste liquor.

26. The composition board of claim 24 wherein the lignin solids in aqueous solution comprises sodium base sulfite waste liquor.

27. The composition board of claim 24 wherein the lignin solids in aqueous solution comprises ammonium base waste liquor.

28. The composition board of claim 24 wherein the lignin solids in aqueous solution comprises Kraft waste liquor.

29. The wood composition board of claim 24 wherein the organic polyisocyanate comprises polymethylene polyphenylisocyanate.

* * * * *